(12) United States Patent
Dredge

(10) Patent No.: US 9,790,901 B1
(45) Date of Patent: Oct. 17, 2017

(54) PNEUMATIC AIR FILTER CLEANER

(71) Applicant: Spencer Dredge, Centerville, UT (US)

(72) Inventor: Spencer Dredge, Centerville, UT (US)

( * ) Notice: Subject to any disclaimer, the term of this patent is extended or adjusted under 35 U.S.C. 154(b) by 26 days.

(21) Appl. No.: 15/133,190

(22) Filed: Apr. 19, 2016

(51) Int. Cl.
*B08B 5/02* (2006.01)
*F02M 35/08* (2006.01)

(52) U.S. Cl.
CPC ............. *F02M 35/086* (2013.01); *B08B 5/02* (2013.01)

(58) Field of Classification Search
CPC .......... F02M 35/086; B08B 5/02; B08B 9/32; B08B 9/30; B08B 9/00; B08B 9/053; B08B 9/0436; F41A 29/02
See application file for complete search history.

(56) References Cited

U.S. PATENT DOCUMENTS

| | | | | |
|---|---|---|---|---|
| 3,958,296 A * | 5/1976 | Fell | ......................... | B01D 41/04 15/304 |
| 4,622,077 A * | 11/1986 | Izumi | ......................... | A61L 9/14 134/22.11 |
| 5,332,448 A * | 7/1994 | Phillips | ................... | B01D 41/04 134/104.3 |
| 8,449,693 B2 * | 5/2013 | Sheffield | ................ | B44D 3/006 134/115 R |
| 8,668,782 B2 * | 3/2014 | Grieve | ................... | B01D 41/04 134/166 R |
| 2010/0083987 A1 * | 4/2010 | Reining | ............. | B01D 46/0068 134/22.12 |
| 2012/0260954 A1 * | 10/2012 | Southwell | .............. | B01D 41/04 134/33 |

* cited by examiner

*Primary Examiner* — Dung Van Nguyen
(74) *Attorney, Agent, or Firm* — Steven Rinehart

(57) ABSTRACT

A pneumatic air filter cleaning device is configured to clean an air filter, a cavity, a pair of openings, and a plurality of fibrous walls that capture contaminants. The device may comprise a first cap and a second cap disposed in a spaced-apart, coplanar relationship. A U-shaped tube extends between the caps in a rotatable relationship. The U-shaped tube has apertures offset from a radial vector configured to discharge pressurized air while rotating 360 degrees. An air tube feeds pressurized air into the U-shaped tube, creating inertia that rotates the U-shaped tube while simultaneously discharging pressurized air from the apertures. The air filter is cleaned from the inside out, and in a uniform manner. An attached container may capture dislodged contaminants.

5 Claims, 9 Drawing Sheets

PNEUMATIC AIR FILTER CLEANER

FIELD OF THE INVENTION

This invention relates to pneumatic device for cleaning an air filter, and more particularly relates to a pneumatic cleaning device that pneumatically cleans air filters having a cavity by positioning in rotatable relation inside the cavity of the air filter and forcing pressurized air outwardly from the cavity, and in uniform distribution through a cross section of the fibrous walls of the air filter.

BACKGROUND

Description of the Related Art

Typically, air filters are used in industrial air cleaning devices to remove the contaminants from contaminated air for vehicles, machinery, and air ventilation units. In many instances, the contaminated air flow being filtered is unidirectional and the residue captured from the air collects mainly on one surface of the air filter. It is necessary to clean these air filters on a regular basis so that they do not become clogged and thereby cause reduced airflow. Generally, these air filters are cleaned in a manner where unclear air is directed generally in the opposite direction to the direction of the direction of the contaminated airflow, to thereby dislodge the captured contaminants.

Cleaning of air filters often requires the use of direct engagement with pressurized air. This may result in dust particles from the air filter flying uncontrollably throughout the air. These dust particles can take hours to settle; thereby causing the work environment to be dirty and unhealthy. Further, once settled, the dust particles are very difficult to clean.

Typically, folded paper/fiber air filters of various types have been replaced when clogged, involving significant expense and effort, or have been cleaned manually and without precision by directing an air hose at the filter element to blow out any loose particles or dust.

Retrofitting traditional air filters with cleaning devices has traditionally also been inefficient because air filters have not come in standards sizes, thus there is no universal aftermarket cleaner available.

Many air filters have a circular or cylindrical shape. These filters also have at least one opening that leads to a cavity. To optimize cleaning of these types of air filters, air must be blown against the directional flow of contaminated intake. This may require discharging pressurized air from the inside out along the entire cross section of the inner surface of this air filter. A device for achieving this operational discharge of pressurized air from this interior position is needed.

SUMMARY

From the foregoing discussion, it should be apparent that a need exists for a pneumatic air filter cleaning device. Beneficially, such a device would clean an air filter inside out and uniformly by positioning in rotatable relation inside a cavity of an air filter, while forcing air outwardly against the fibrous walls of the air filter.

The present invention has been developed in response to the present state of the art, and in particular, in response to the problems and needs in the art that have not yet been fully solved by currently available air filter cleaners. Accordingly, the present invention has been developed to provide a device for pneumatically cleaning an air filter, the device comprising: a first cap, the first cap comprising a cap inlet; a second cap, the second cap disposed in a spaced-apart, coplanar relationship with the first cap; a ring, the ring configured to help fasten the second cap in a fixed configuration; a U-shaped tube, the U-shaped tube comprising a first end configured to join with the first cap in a rotatable relationship, the U-shaped tube further comprising a second end configured to join with the second cap in a rotatable relationship; the U-shaped tube forming a radial vector from an axis point around which the U-shaped tube rotates, the U-shaped tube further comprising a plurality of apertures for dispelling compressed air, the apertures positioned on an exterior of the U-shaped tube offset between 5 degrees and 85 degrees off the radial vector; an air tube, the air tube comprising an outlet end configured to join with the cap inlet of the first cap, the air tube further comprising an intake end configured to receive pressurized air; whereby the pressurized air creates inertia in the U-shaped tube, causing rotation of the U-shaped tube in relation to the first cap and the second cap while simultaneously discharging the pressurized air through the plurality of apertures; and a container.

The device may be configured to pneumatically clean an air filter having a generally cylindrical shape, a plurality of fibrous walls, a cavity, and a pair of openings.

The container may be a bag, the bag disposed at either opening of the air filter for capturing contaminants dislodged from the plurality of fibrous walls.

The first cap and the second cap may engage the pair of openings from the air filter in a fixed and sealed relationship. The air may comprise a gas from the group of oxygen, carbon dioxide, nitrogen, hydrogen and helium.

A method for pneumatically cleaning an air filter is also provided, the method comprising: rotating a U-shaped tube axially around an axis within an air filter; dispelling compressed air from a plurality of apertures defines by the U-shaped tube, the apertures offset from a radial vector defined by the U-shaped tube; ejecting particulates from an air filter; and capturing dislodged contaminants from the filtering means.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. The order in which a particular method occurs may or may not strictly adhere to the order of the corresponding steps shown.

Figure 1:
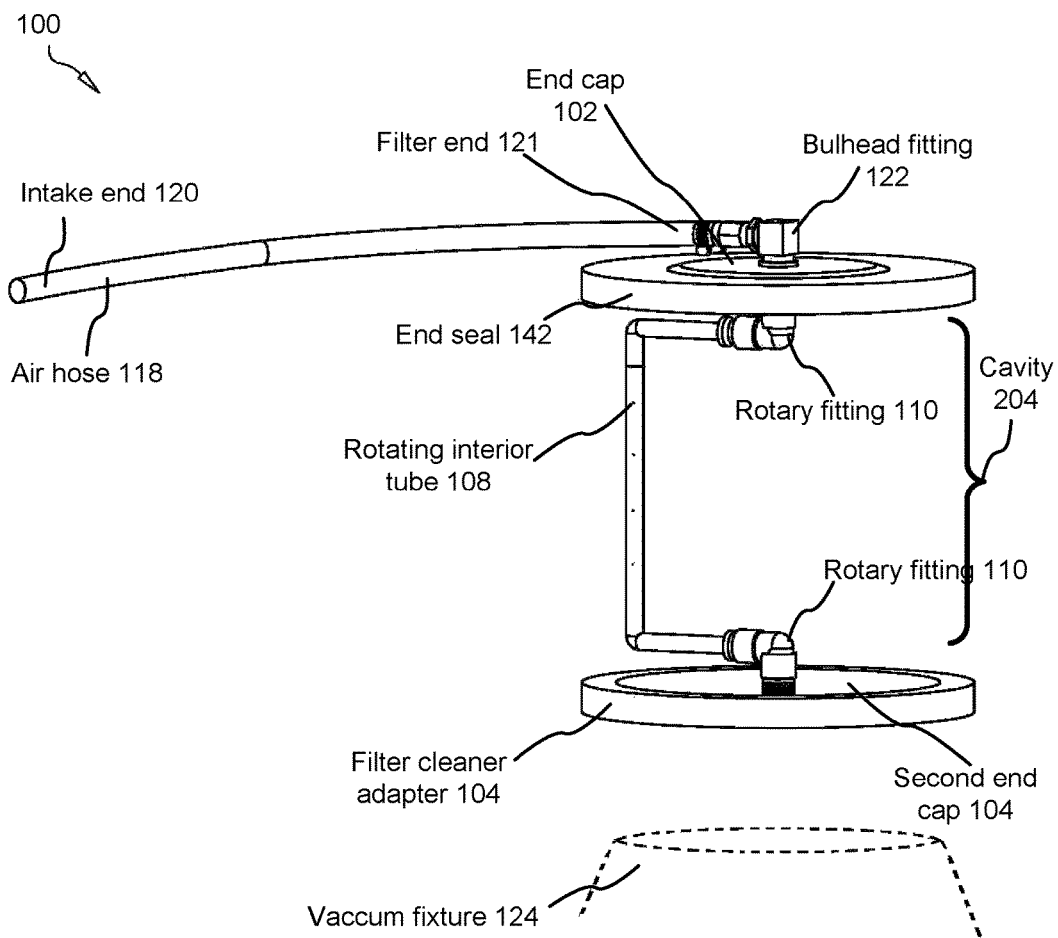
FIG. 1 is a lower elevational perspective view illustrating one embodiment of a pneumatic air filter cleaning device without the filter shown in accordance with the present invention.

FIG. 1 depicts a pneumatic air filter cleaning device 100. The pneumatic air filter cleaning device 100 (hereinafter "device 100") is configured to clean an air filter 200 from inside out, and in a uniform manner. The device 100 is especially effective for cleaning the type of air filter 200 depicted shown in FIG. 2. The air filter 200 depicted in FIG. 2 has a substantially cylindrical shape, a cavity 204, a pair of openings 206, and a plurality of fibrous walls 202 configured to capture contaminants.

The device 100 positions in a rotatable relationship inside the cavity 204 of the air filter 200. The rotation and interior positioning of the device 100 create the capacity to clean the air filter 200 with pressurized air from inside out, and in a uniform manner. The pressurized air is directed generally in the opposite direction to the direction of the direction of the contaminated airflow. Though in other embodiments, the device 100 may also be used to clean any types of air filters having a variety of shapes and dimensions, as long as the air filter 200 is defined at least partially by an interior space sufficient for the device 100 to rotatably operate within.

As shown in FIG. 1, the device 100 comprises a first cap 102 and a second cap 104 disposed in a spaced-apart coplanar relationship. The caps 102, 104 may have a generally flat, circular shape that substantially matches the openings 206 of the air filter 200. In one embodiment, the first and second end caps 102, 104 have a circumference that is substantially the same as the circumference of the openings 206 at the ends of the air filter 400. Though in other embodiments, the shape of the caps 102, 104 may be varied to conform to the dimensions of the openings 206 in the air filter 200.

The first and second caps 102, 104 may comprises bearing and/or may fixedly engage the edges of openings 206 in the air filter 200 and remain stationary while the air filter 200 is being rotatably cleaned. The first and second caps 102, 104 also sealably engage the edges of openings 206 in the air filter 200 to restrict escape of air pressure from the openings 206. In one possible embodiment, the periphery of the caps 102, 104 may include a rubber gasket that creates an air tight seal with the inner edge of the openings 206 from the air filter 200. Though, the fixed, sealed engagement may still allow for rotation and disengagement with an applied axial or rotational force.

In one embodiment, the first cap 102 includes a cap inlet that is configured to enable passage of pressurized air from an air source. A nut 116 may be used to securely fasten the cap inlet 106 to the air source. In one embodiment, the first cap 102 comprises a first cap opening 124 that is disposed concentrically in the first cap 102. The first cap opening 124 is configured to receive a first end 110 of a U-shaped tube 108, discussed below. Similarly, the second cap 104 comprises a second cap opening 126 that is disposed concentrically in the second cap 104. The second cap opening 126 is configured to receive a second end 112 of a U-shaped tube 108, discussed below.

The device 100 comprises an air hose 118 having an intake end 120 and a filter end 121. The air hose 118 may be flexible or rigid, and may be affixed permanently for detachably to a bulkhead fitting 122 and/or a rotary fitting 110. In various embodiments, the bulkhead fitting 122 comprises a fitting for engaging the air hose 118 permanently or detachably, and may comprise a 90 degree elbow.

The rotary fitting 110 engages the bulkhead fitting 122 via means known to those of skill in the art, including a threading or friction fit. In some embodiments, the rotary fitting 110 integrates with the bulkhead fitting 122 for a single integrated piece. The rotary fitting 110 comprises a bearing for supporting the remainder of the rotary fitting 110 while the rotary fitting 110 rotates axially in place. The bearing of the rotary fitting 110 may be affixed to an end seal 142 or end cap 102.

The device 100 comprises one or more rotating interior tubes 108. These tubes comprise U-shaped (or C-shaped) rigid tubes which rotate within a cavity 204 defined by the end caps 102, 104. The tube 108 directs compressed air flowing through the tube 108 axially around the perimeter of the cavity 204.

The tube 108 defines (or comprises) a plurality of aperture, or holes, which expel the compressed air. As the air is expelled from the apertures, the tube 108 is propelled axially around the cavity 204. The compressed air is forced into a permeable sleeve surrounding the device 100, which filters air entering a vacuum fixture 124 affixed to the device 100. The compressed air expelled from the tube 108 is forced through the surrounding sleeve and forces particulates which have accumulated on the sleeve from the sleeve.

For the purposes of this writing, the term "air may comprises any gas, or combination of gases, including ambient breathable air, substantially pure oxygen, substantially pure nitrogen, substantially pure hydrogen, helium, and the like.

The air hose 118 contains positive pressure air flow, which in various embodiments, is supplied by a compressor, a blower, a cylinder, or any other means known to those of skill in the art.

The tube 108 is affixed, in the shown embodiment, to a second end cap 104, which supports the axial rotation of the tube 108.

It is an object of the present invention to provide a pneumatic air filter cleaning device which is useful for vacuums which serve a variety of applications, including dust filtration or extraction from the interior of industrial buildings, household cleaning vacuums, handheld vacuums, and air filters in vehicles or used in connection with fuel combustion engines.

Additionally, the present invention may be used equally for filters which filter ambient air as well as filters which filter particulates from other types of gases being intaken into a vacuum (including oxygen and carbon dioxide).

Figure 2:
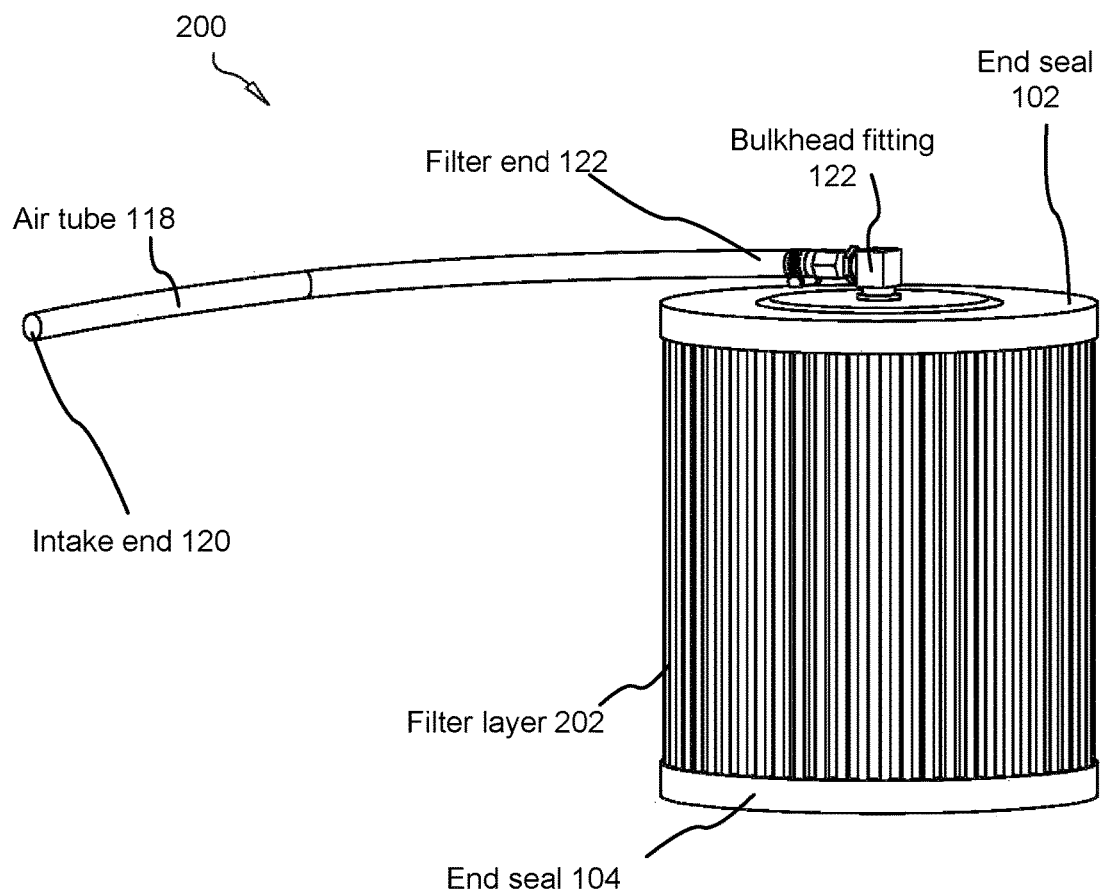
FIG. 2 is a lower elevational perspective view illustrating one embodiment of a pneumatic air filter cleaning device with the filter shown in accordance with the present invention.

FIG. 2 is a lower elevational perspective view illustrating one embodiment of a pneumatic air filter cleaning device with the filter shown in accordance with the present invention. FIG. 2 serves to illustrate the filter layer 202, or permeable sleeve, which surround the device 100. The tube 108 rotates inside the filter layer 202 and expels dust and particulates from the exterior of the filter layer 202. In various embodiments, the filter layer 202 comprises a fibrous air filter, which permeable or semi-permeable to filter entry of particulates into a vacuum.

The filter layer 202 may be open-ended at one end or two. The device 200 may be single open-ended or double open-ended and a plurality of devices 200 may be stackable together.

Figure 3:
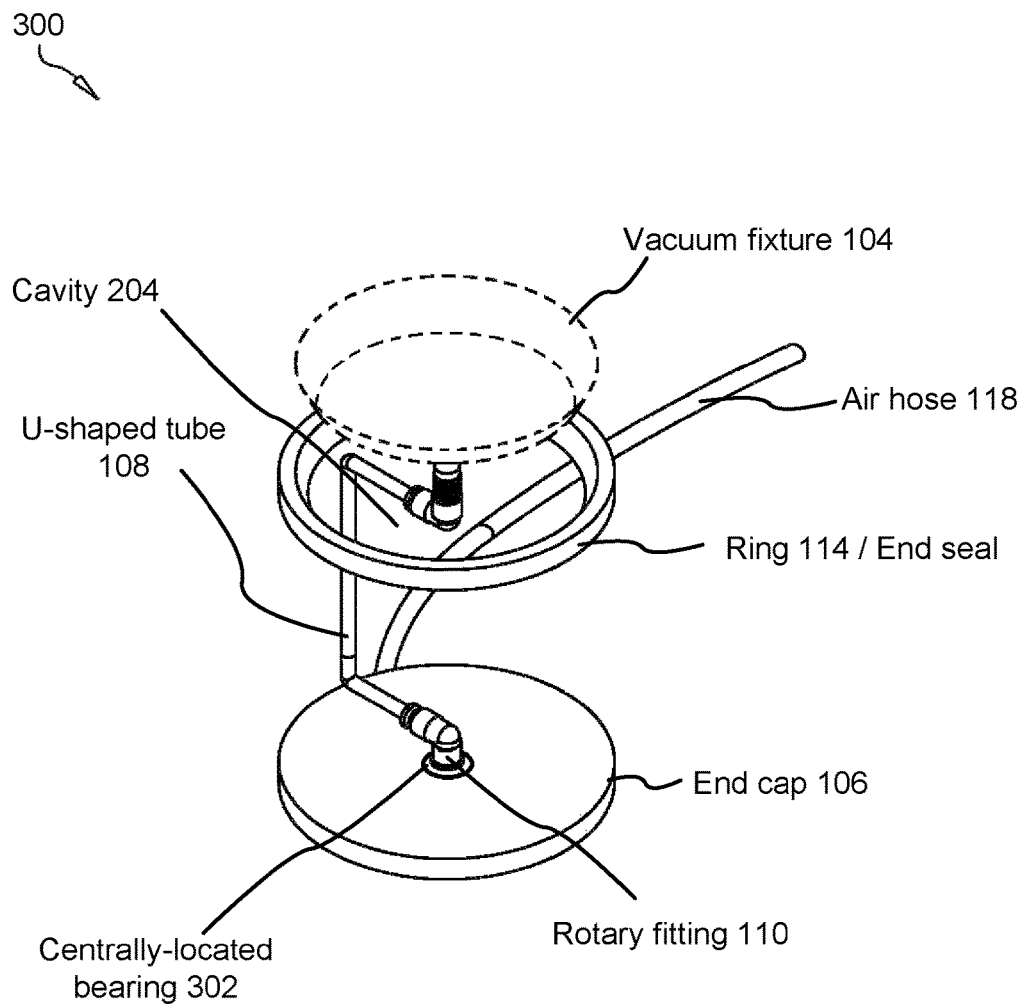
FIG. 3 is an upper elevational perspective view illustrating one embodiment of a pneumatic air filter cleaning device in position to engage an air filter in accordance with the present invention.

Looking now at FIG. 3, the device 100 may include a ring 114 (or end seal) that encompasses the second cap 104 and/or the first cap 102. In one embodiment, the ring 114 serves as a fastener, helping to secure the second cap 104 against the edges of the an opening 206 (shown in FIG. 4) in the air filter 200. In one alternative embodiment, a secondary ring may be used with the first cap 102. Suitable materials for the caps 102, 104 may include, without limitation, aluminum, metal alloys, a rigid polymer, fiberglass, and wood.

As shown, the end cap 106 may comprises a centrally-located bearing 302. The tube 108 may join with a rotary fitting 110 to either or both end caps 102, 104.

Figure 4:
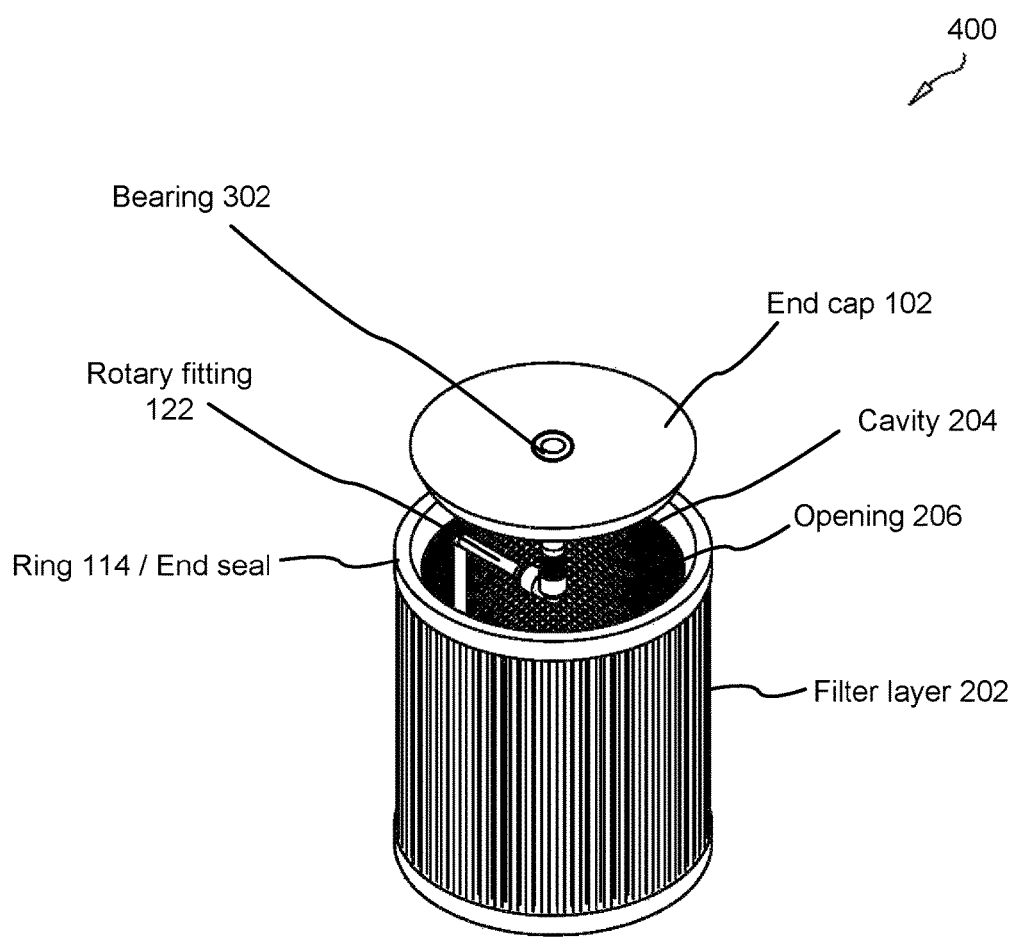
FIG. 4 is a lower elevational perspective view illustrating one embodiment of a pneumatic air filter cleaning device positioning inside a cavity of an air filter in accordance with the present invention.

As FIG. 4 references, the device 400 includes the U-shaped tube 108 that extends between the first and second end caps 102, 104. The U-shaped tube 108 is defined by a first end 110 that engages the first cap 102 in a rotatable relationship, and a second end 112 that engages the second cap 104 in a rotatable relationship. A central body of the U-shaped tube 108 forms a bend. The bend is sized to rotate freely inside the cavity 204 of the air filter 200. The length of the U-shaped tube 108 and the angle of the bend may be configured to conform to the area inside the cavity 204 of an air filter 200. In one alternative embodiment, the U-shaped tube 1078 is malleable, so as to change shapes when a force is applied. This allows the device 100 to be operable with variously sized air filters.

The pressurized air passing through the U-shaped tube 108 creates inertia and centrifugal forces that enable the U-shaped tube 108 to rotate in relation to the fixed first and second caps 102, 104, and to the air filter 200. Thus, when positioned snugly inside the cavity 204 of the air filter 200, the fixed position of the first and second caps 102, 104 in relation to the openings 206 of the air filter 200 enable the U-shaped tube 108 to rotate freely inside the cavity 204 of the air filter 200.

The U-shaped tube 108 is defined by a plurality of apertures (shown below) configured to discharge pressurized air. The apertures may be disposed in an evenly spaced-apart relationship along a substantial portion of the surface area of the U-shaped tube 108. The U-shape provides a large surface area from while a plurality of apertures are positioned in a spaced-apart relationship. Because the U-shaped tube 108 rotates from the inertia created by the pressurized air, the pressurized air may be discharged from the apertures in a 360° orientation along the entire surface of the fibrous walls of the filter layer 202.

The device 400 further includes the aforesaid air tube 118 for carrying pressurized air to the U-shaped tube 108. The air tube 118 has an outlet end 122 that couples to the cap inlet 106 of the first cap. A nut 116 (not shown) may threadably fasten the cap inlet 106 (not shown) to the outlet end 122 of the air tube 118. The air tube 118 further includes an intake end 120 that couples to a source of pressurized air. The pressurized air source may include a compressor.

As illustrated in FIG. 4, the device 400 is configured to operate inside the cavity 204, or space, of an air filter 200. In one embodiment, the device 100 is used in cleaning a hollow cylindrically-shaped air filter. The hollow cylindrically-shaped air filter may have a cavity 204, a pair of openings 206, and a plurality of fibrous walls 202 disposed in a layered configuration to optimize the capture of contaminants.

The filter layer 202 surrounds the filter cleaner 400 forming a cylindrical sleeve in the shown embodiment. The recess defined within the filter layer 202 is the cavity 204 in which the device 400 positions.

The ring 114 defines an opening 206. The device 400 may be open or closed on the top or bottom.

The end caps 102, 104 may be drilled into the air filter and/or the air filter cleaning device, or may alternatively be aftermarket added components, or may be stock components.

Figure 5:
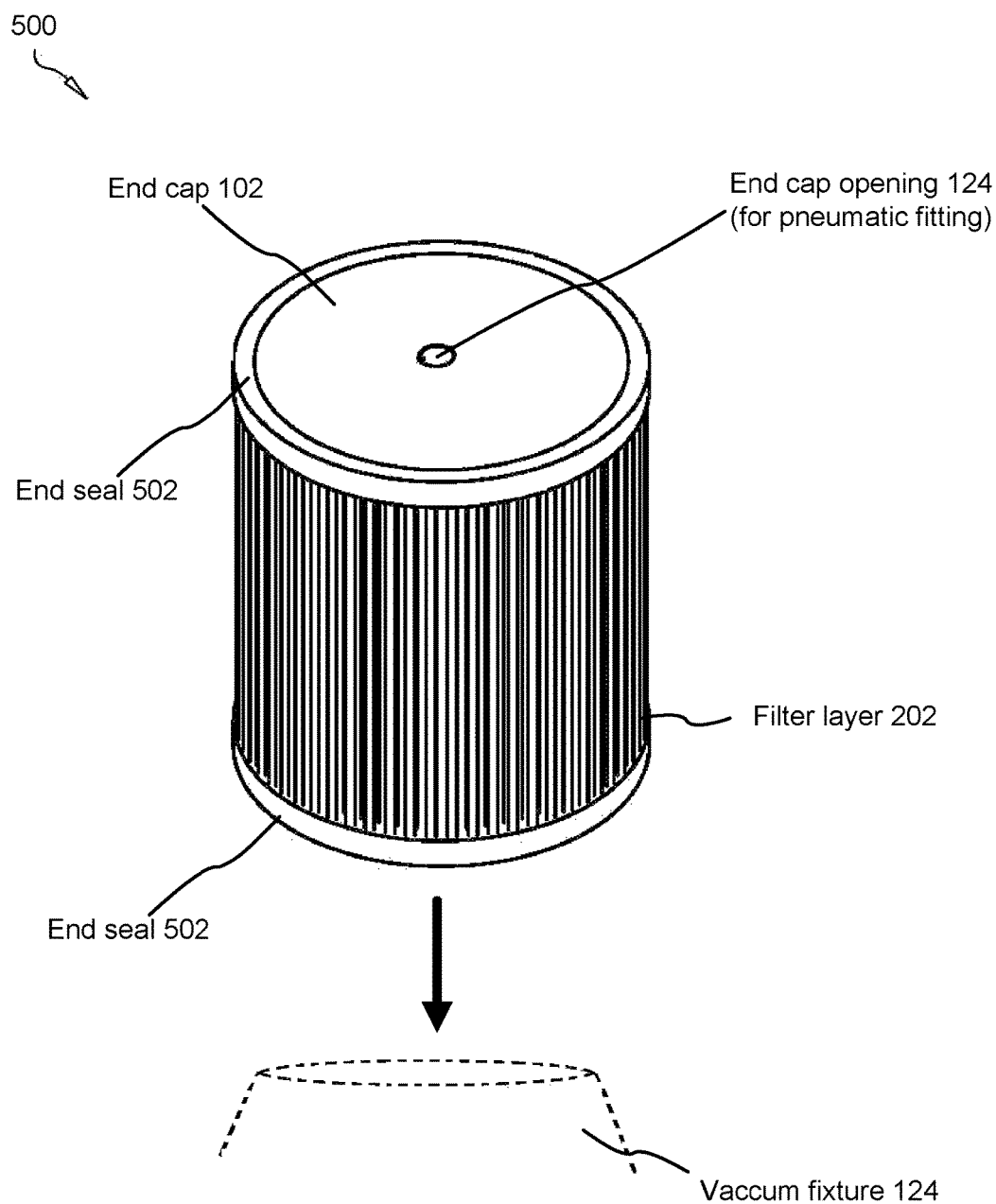
FIG. 5 is a perspective view illustrating one embodiment of a pneumatic air filter cleaning device operational inside an air filter in accordance with the present invention.

Looking now at FIG. 5, the device 100 may be sized and dimensioned to fit inside different industry standard air filters. In one exemplary use, the first cap 102 and the second cap 104 fit snugly and in a fixed relationship with the correlating openings 206 at the ends of the air filter 200. The U-shaped tube 108 between the caps 102, 104 rotates freely inside the cavity 204, using the fixed relationship with the caps 102, 104 as a brace.

The air tube 118 feeds pressurized air to the U-shaped tube 108. The pressurized air discharges through the apertures in the U-shaped tube 108. This creates inertia that causes the U-shaped tube 108 to rotate inside the cavity 204 of the air filter 200 while simultaneously discharging the pressurized air through the fibrous walls of the filter layer 202 of the air filter 200.

The sealed relationship between the first and second caps 102, 104, and the openings 206 in the air filter 200 creates sufficient pressure to force the air through the fibrous walls 202, and thereby dislodge contaminants therefrom. Further, because the apertures are in a uniform spaced-apart relationship, and the pressurized air is discharged in a 360° orientation, the fibrous walls 202 receive uniform cleaning. Further, because the U-shaped tube 108 is inside the cavity 204 of the air filter 200, an inside out cleaning procedure is possible.

In one alternative embodiment, a container (not shown) may be fastened to the device 100, proximally to the air filter 200 to capture the contaminants. Because pressurized air is dislodging the contaminants from inside the fibrous walls of the filter layer 202, the container helps prevent the contaminants from dispersing outwardly in a random, undesirable manner. The container may include, without limitation, a bag.

A method of the present invention is also presented for cleaning an air filter 200 uniformly and from an inside out orientation. The method in the disclosed embodiments substantially includes the steps necessary to carry out the functions presented above with respect to the operation of the described apparatus and system. In one embodiment, the method includes positioning a first cap and a second cap 102, 104 in a fixed relationship with a pair of openings 206 in an air filter 200. The method also may include a step of rotating a U-shaped tube 108 inside a cavity 204 of the air filter 200.

In a further embodiment, the method includes providing air to the U-shaped tube 108 from an air tube 118. Yet another step comprises discharging air across a uniform cross section of fibrous walls 202 through a plurality of apertures, whereby the air filter 200 is cleaned inside out and uniformly.

Thus, the device 500 provides means for pneumatically cleaning the air filter. These may include: means for filtering contaminants; means for fixedly engaging the filtering means; means for rotating inside the filtering means; means for discharging force from the rotatable means towards the filtering means; and means for capturing dislodged contaminants from the filtering means.

Figure 6:
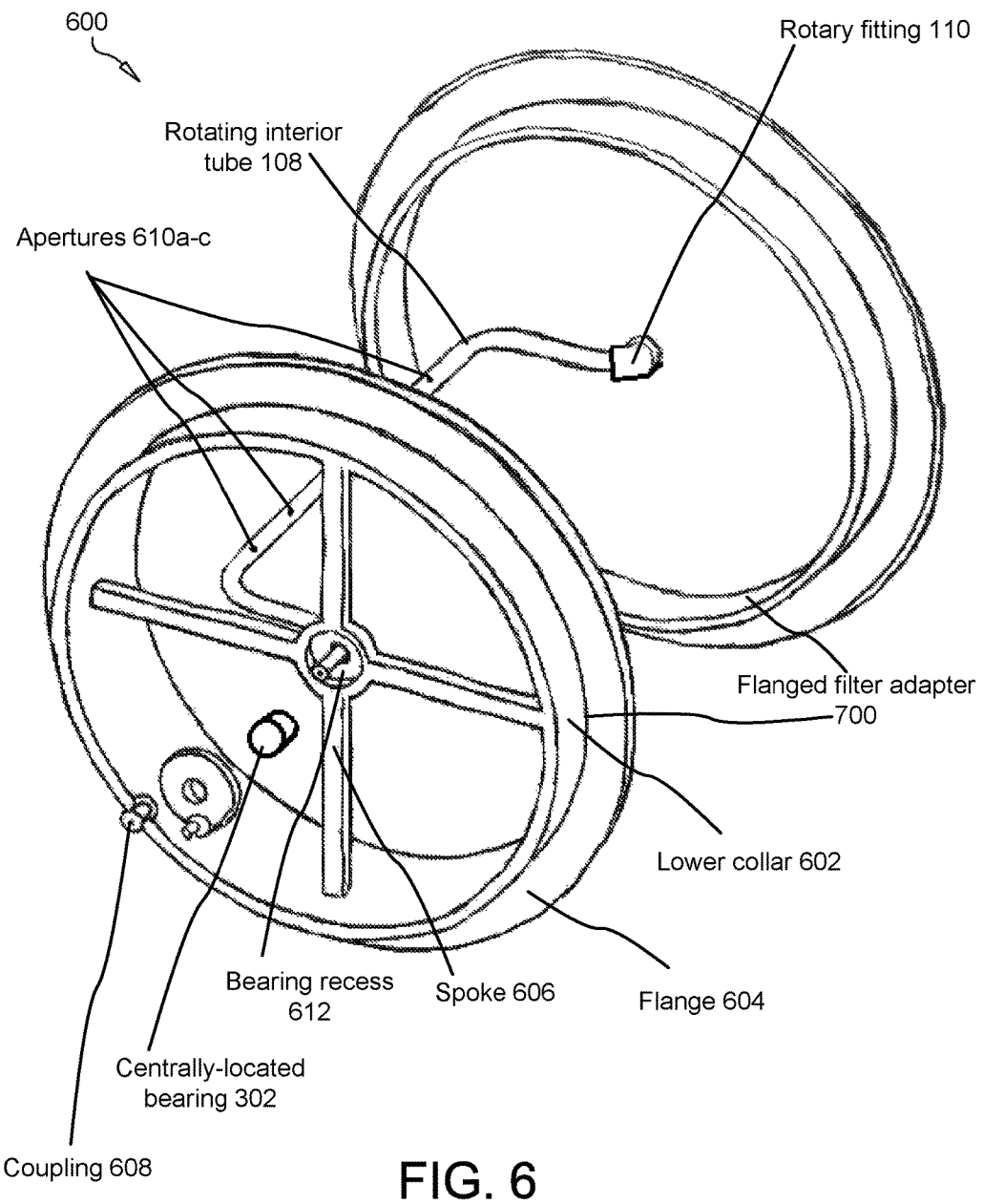
FIG. 6 is an upper side perspective view illustrating one embodiment of a pneumatic air filter cleaning device operational inside an air filter in accordance with the present invention.

FIG. 6 is an upper side perspective view illustrating a different embodiment of a pneumatic air filter cleaning device 600 operational inside an air filter in accordance with the present invention. This embodiment differs from the embodiments described above inasmuch as device 600 is configured to be universal, or to fit any number of vacuum fixtures 124 of differing sizes and dimensions.

Like heretofore described embodiments, the device 600 comprises a tube 108, and a rotary fitting 110. Unlike previous embodiments, the device 600 comprises one or more flanged filter adapters 700 (described below). The tube 108 rotates between these flanged filter adapters 700. The flanged filter adapter 700 which is disposed at the higher end of the device 600 affixes to a flexible sleeve 902 (described below) which tapers or widens in conical fashion to interconnect with a vacuum fixture 124.

The flanged filter adapters 700 may comprise two more spokes 606 for stabilizing a centrally-located bearing 302 within a bearing recess 612 defined by the a intersection point of the spokes 606.

In various embodiments, the apertures 610 (also called air ports) for dispelling compressed air are positioned around the exterior of the exterior of the U-shaped, offset by between 5 degrees and 85 degrees from the radius defined by the U-shaped tube, the radius having a center at the axis point around which the U-shaped tube rotates.

Figure 7:
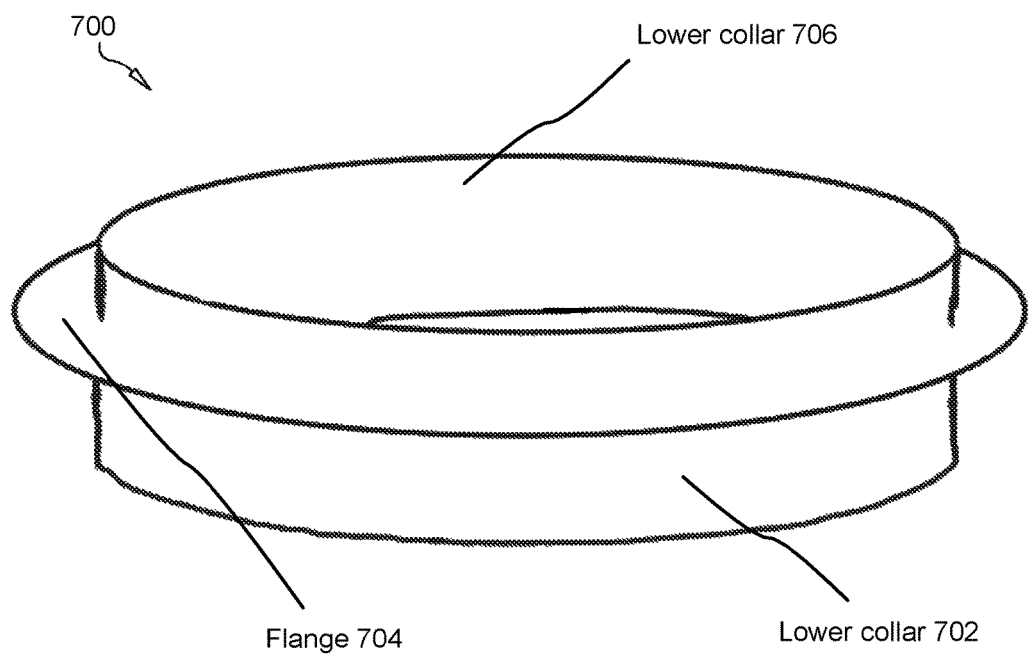
FIG. 7 is an upper perspective view illustrating one embodiment of flanged filter adapter in accordance with the present invention.

FIG. 7 is an upper perspective view illustrating one embodiment of flanged filter adapter 700 in accordance with the present invention. The flanged filter adapter 700 comprises a cylinder having a lower collar 702 and an upper collar 706. The upper collar 706 may engage a flexible sleeve 902 which attaches to a vacuum fixture 124 using a pipe clamp or worm drive clamp, or other means known to those of skill in the art.

Figure 8:
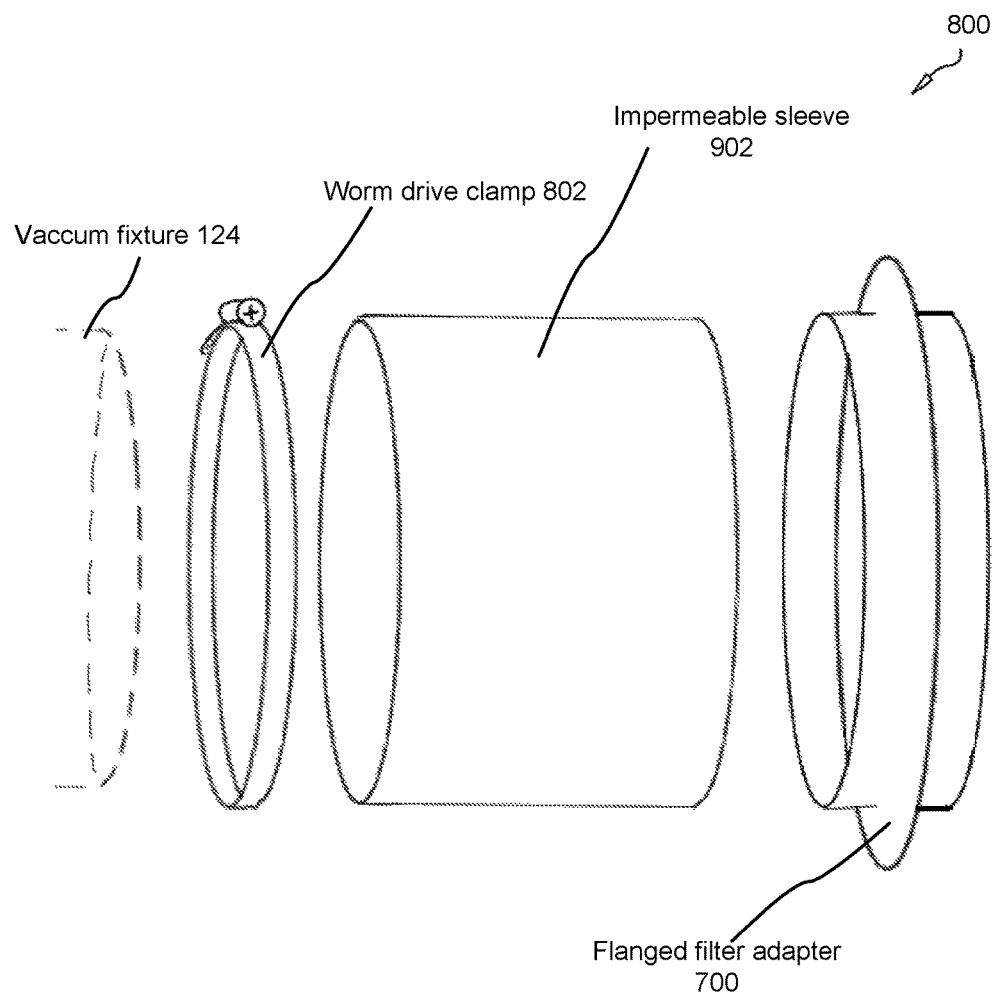
FIG. 8 is a side perspective view illustrating one embodiment of a pneumatic air filter cleaning device in accordance with the present invention.

FIG. 8 is a side perspective view illustrating one embodiment of a pneumatic air filter cleaning device 800 in accordance with the present invention. As shown the filter layer 202 is disposed around a flanged filter adapter 700. In the shown embodiments, the filer layer 202 or the impermeable flexible sleeve 902 affixes directly to a vacuum fixture 124, but as affix to an end cap 102, 104, end seal 114, or second flanged filter adapter 700.

Figure 9:
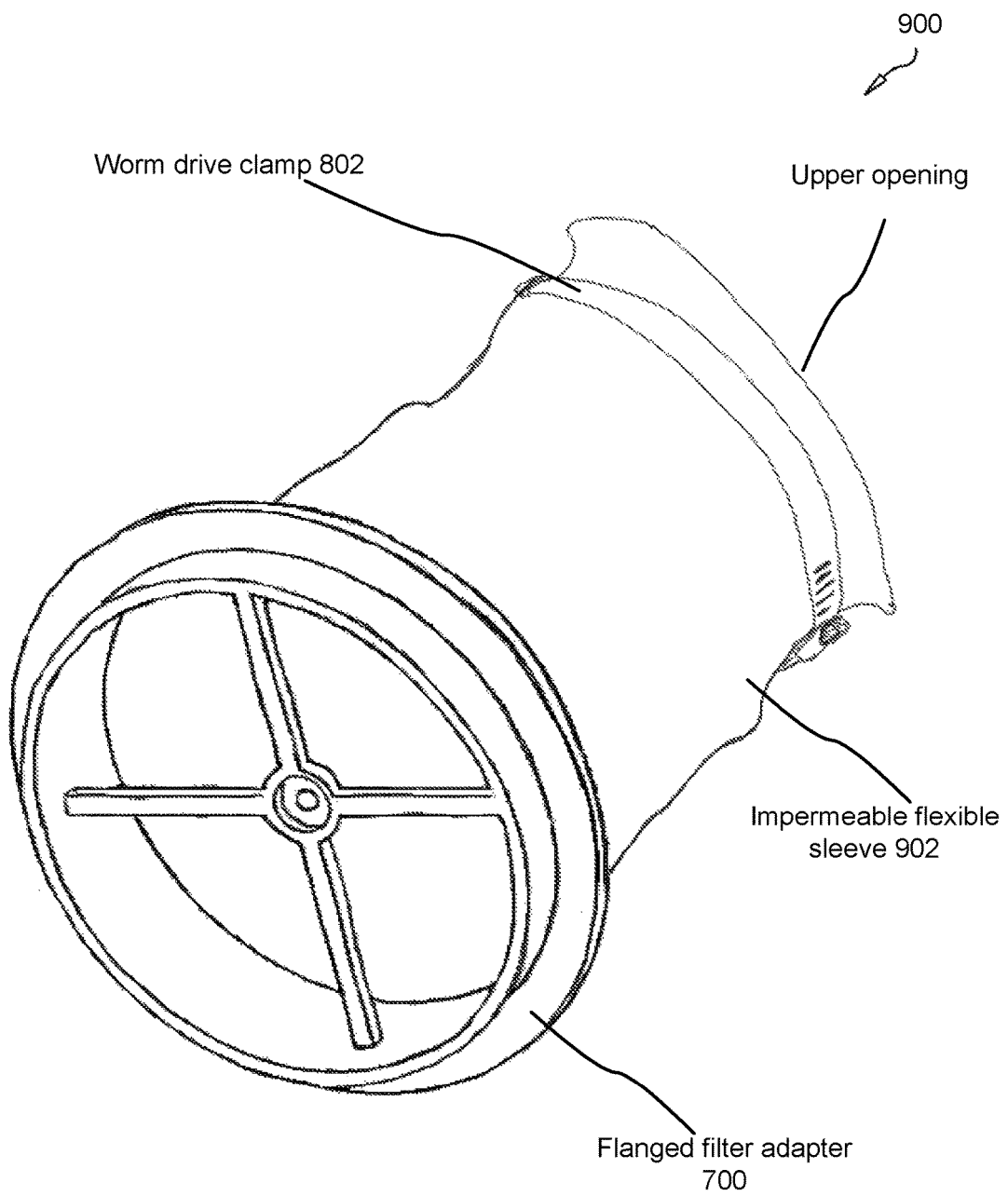
FIG. 9 is an upper side perspective view illustrating one embodiment of a pneumatic air filter cleaning device operational inside an air filter in accordance with the present invention.

FIG. 9 is an upper side perspective view illustrating another embodiment of a pneumatic air filter 900 cleaning device in accordance with the present invention. The shown flanged filter adapter 700 is disposed beneath, and hangs beneath, the impermeable flexible sleeve 902.

The flexible sleeve 902 is impermeable, forcing air to be intaken to an affixed vacuum through the filter layer 202 hanging beneath the flexible sleeve 902. The flexible sleeve 902 may stretch in some embodiments. The flexible sleeve 902 affixes to the vacuum fixture 124 using means known to those of skill in the art. In the shown embodiment, the flexible sleeve 902 affixes to the vacuum fixture 124 using a worm drive clamp 802.

Because the flexible sleeve 902 affixes to vacuum fixtures 124 of various diameters on its upper end using an upper opening, and because the lower end of the flexible sleeve 902 affixes using a lower opening to flanged filter adapter 700 which affixes to a standard-sized device 600.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for pneumatically cleaning an air filter, the device comprising:

a first cap, the first cap comprising a cap inlet;

a second cap, the second cap disposed in a spaced-apart, coplanar relationship with the first cap;

a ring, the ring configured to help fasten the second cap in a fixed configuration;

a U-shaped tube, the U-shaped tube comprising a first end configured to join with the first cap in a rotatable relationship, the U-shaped tube further comprising a second end configured to join with the second cap in a rotatable relationship;

the U-shaped tube forming a radial vector from an axis point around which the U-shaped tube rotates, the U-shaped tube further comprising a plurality of apertures for dispelling compressed air, the apertures positioned on an exterior of the U-shaped tube offset between 5 degrees and 85 degrees off the radial vector;

an air tube, the air tube comprising an outlet end configured to join with the cap inlet of the first cap, the air tube further comprising an intake end configured to receive pressurized air;

whereby the pressurized air creates inertia in the U-shaped tube, causing rotation of the U-shaped tube in relation to the first cap and the second cap while simultaneously discharging the pressurized air through the plurality of apertures; and a container.

2. The device of claim 1, wherein the device is configured to pneumatically clean an air filter having a generally cylindrical shape, a plurality of fibrous walls, a cavity, and a pair of openings.

3. The device of claim 2, wherein the container is a bag, the bag disposed at either opening of the air filter for capturing contaminants dislodged from the plurality of fibrous walls.

4. The device of claim 3, wherein the first cap and the second cap engage the pair of openings from the air filter in a fixed and sealed relationship.

5. The device of claim 1, wherein the air comprises a gas from the group of oxygen, carbon dioxide, nitrogen, hydrogen and helium.

* * * * *